April 4, 1967 — C. E. STAPLES — 3,312,818
SPEED CONTROL SYSTEM
Filed Oct. 12, 1964
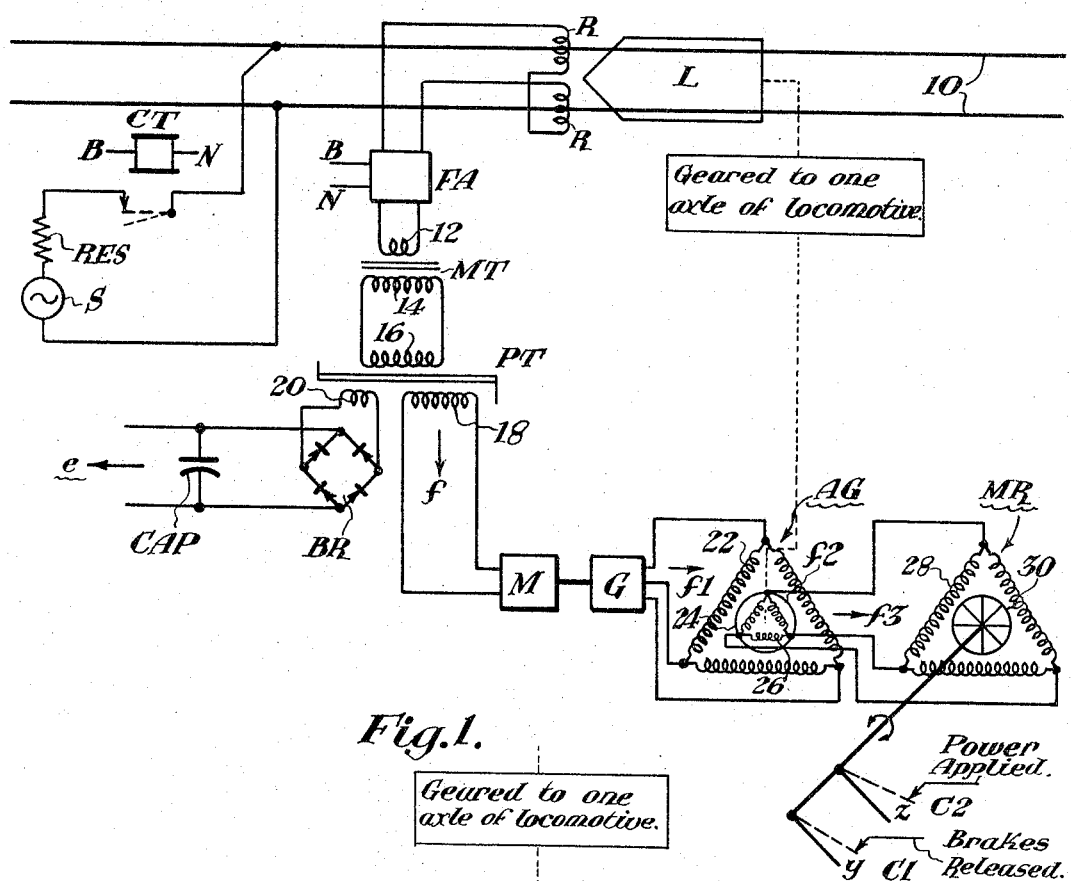
Fig.1.
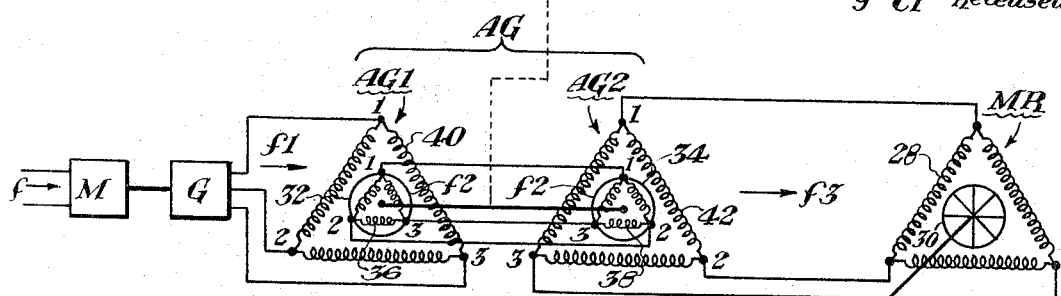
Fig.2.
Fig.3.
INVENTOR.
Crawford E. Staples.
HIS ATTORNEY

United States Patent Office 3,312,818
Patented Apr. 4, 1967

3,312,818
SPEED CONTROL SYSTEM
Crawford E. Staples, Edgewood, Pa., assignor to Westinghouse Air Brake Company, Swissvale, Pa., a corporation of Pennsylvania
Filed Oct. 12, 1964, Ser. No. 403,116
7 Claims. (Cl. 246—182)

This invention relates to a speed control system for a moving body such as a train having a member rotating at a speed proportional to its speed of movement, and more particularly to a train speed control system wherein the track rails are supplied with a command speed signal of a coded or modulated carrier frequency.

In such train speed control systems it is necessary to have train-carried apparatus of the type which receives and compares the command speed signal from the track rails with the actual speed of the train. Such apparatus should be simple, reliable and relatively maintenance free.

Accordingly, it is an object of this invention to provide a new and improved train speed control system.

It is another object of this invention to provide a new and improved speed control system which can be used to control the speed of a body having a member rotating at a speed indicative of the desired speed.

It is a further object of this invention to provide a new and improved speed control system which utilizes an alternating current axle generator to actuate an inductive type relay according to a command speed signal.

Briefly, the present invention accomplishes the above-cited objects by providing train-carried apparatus which detects the coded or modulated command speed signal supplied to the train, which signal is then amplified and demodulated to produce an alternating current output at a frequency proportional to the command speed signal, which output energizes the field of an alternating current axle generator. The rotor of the axle generator is coupled to the axle of the train through an appropriate gear drive mechanism and rotates at a speed proportional to the actual speed of the train. Due to the difference between the actual speed of the rotor and the electrical speed of the field of the axle generator, the rotor output is at a frequency proportional to the difference between the frequency of the command speed signal and the frequency of the actual train speed signal. The rotor output is then utilized to energize the field of a master relay of the inductive motor type. The master relay rotor has a torque imposed thereon, which torque is a function of the frequency of the energy applied to the master relay field. The limited rotational movement of the rotor of the master relay is then used to make and break contacts actuated by this movement to control the train speed by selectively energizing or deenergizing power circuits and braking circuits.

Further objects, features and advantages of my invention will become apparent as the description proceeds when taken in connection with the drawings in which:

FIG. 1 shows schematically the speed control system according to the invention.

FIG. 2 shows schematically a modification of the speed control system according to the invention.

FIG. 3 graphically illustrates the relationship between the code or modulation rate and the command speed of the rotating member.

Referring now to FIG. 1 of the drawings, there is shown a pair of track rails 10 to which is applied pulses of energy from an alternating current signal source S through a resistor RES in series therewith over the front contact of a code transmitter relay CT. The code transmitter relay CT is of the conventional type which, when supplied with direct current from a direct current source having its positive and negative terminals designated B and N, respectively, has its contacts opening and closing a predetermined number of times per minute. The code rate of the code transmitter CT can be one of several commonly employed, and in the usual type of track circuit the code rate is determined by traffic conditions in advance of the given section.

Running on the track rails 10 is a locomotive L of a train advancing from right to left toward the point of application of the coded alternating current signal to the track rails 10. Located on the locomotive L in advance of the front wheels thereof is a pair of pickup coils or receivers R connected in series aiding relationship and positioned in inductive relationship with the track rails 10. The coded signal picked up by the receivers R is fed into a filter amplifier FA which is tuned to respond to the frequency of the alternating current signaling source S, and the signal is thus amplified and rectified to provide a pulsed direct current output to the primary 12 of a master transformer MT. This output would be the envelope of the coded or modulated carrier signal. The power for filter amplifier FA is received from a direct current source, the positive and negative terminals being designated B and N, respectively.

The secondary 14 of the master transformer MT is connected to the primary 16 of a pulse transformer PT which is shown as having a saturable core. The construction of both the master transformer MT and pulse transfomer PT is well known in the art and no further explanation thereof is deemed necessary. The pulse transformer PT has a first and a second secondary winding, the first secondary winding 18 benig coupled to the input of a motor designated by a block with the letter M therein. The second secondary winding 20 is connected across a full-wave rectifier bridge BR, the output providing a direct current voltage designated by $e$, the output being taken across a smoothing capacitor CAP. The purpose of this direct current voltage will be discussed in detail later.

The motor M has its shaft coupled to the shaft of a multiphase generator represented by the block having the designation G therein. The output of the generator G is fed into the three-phase field stator winding 22 of axle generator AG. The rotor 24 of axle generator AG is of the wound rotor type with slip rings (not shown) and the rotor winding 26 is electrically connected to the three-phase field stator winding 28 of a motor-type induction relay MR. The rotor 30 of the axle generator AG is geared to an axle of the locomotive L so that it is driven at a speed proportional to the train speed.

The motor relay MR is well known in the art and is of the type that has a squirrel-cage rotor, the rotor 30 being spring biased and having stops in either direction to provide limited angular rotation, the angle of rotation being determined by the torque applied to the rotor 30, which torque would be a function of the frequency of the energy applied to the stator field 28. The rotor movement actuates contacts indicated as C1 and C2, the opening and closing of the contacts being dependent upon the angle of rotation of the rotor 30 of the motor relay MR.

In operation, the carrier signal is fed to the track rails 10 from the alternating current signaling source S and is coded by the code transmitter CT at a code rate proportional to the speed command indicative of the desired train speed. It is to be understood, however, that modulation may be used instead of coding, and it is a purpose of this invention to include carrier signal modulation. The receivers R on the front end of the locomotive L pick up the coded signal from the track rails 10 and this signal is filtered, amplified and rectified by filter amplifier FA to produce an output of direct current pulses which are substantially the envelope of the coded carrier signal. This output energizes the master transformer MT in the usual manner. The output of the master transformer MT energizes the pulse transformer PT. When the code transmitter CT contact closes, a pulse output of one polarity is obtained from the pulse transformer PT, and when the contact opens the pulse output is of the opposite polarity. The design of the two transformers is such that the energy of the pulse level is substantially the same, independent of track circuit energy level or power supply on the train. Thus, the output of the pulse transformer PT is a succession of substantially constant pulses of alternating energy at a frequency $f$, the same as the code transmitter CT and therefore proportional to the speed command.

The output of the pulse transformer PT through the first secondary winding 18 thereof, drives motor M (which might be a single-phase shaded-pole motor) at a speed proportional to the speed command frequency $f$. Amplification may be added at this stage if required, and a flywheel may be used to overcome the pulsing effect of the pulse transformer PT. The second secondary winding 20 of the pulse transformer PT can be utilized to provide a direct current voltage $e$ from the full-wave rectifier bridge BR, the output of which is smoothed by the capacitor CAP. The direct current voltage $e$ would be proportional to the frequency $f$ and can be used to actuate a speed command indicator for visual observation by the operator of the locomotive L.

The motor M may be directly coupled or coupled through appropriate gearing to drive the three-phase generator G, which is preferably of the permanent magnet type, to provide a direct relationship between frequency and voltage as a function of the speed of the generator G. The output of generator G is at a frequency $f1$ which is proportional to the command speed signal. The output of the generator G is fed into the three-phase field stator winding 22 of axle generator AG to thereby induce a rotating electrical field therein at the frequency $f1$. The rotor 24 of the axle generator AG is geared to the axle of the locomotive L and is thereby driven at a speed which is proportional to the actual speed of the train. The direction of rotation is so arranged that the rotor 24 will rotate in the same direction as the field of the stator winding 22 of the axle generator AG. The rotor 24 has a frequency of rotation $f2$ associated therewith, which frequency can be defined as the output frequency of the rotor 24 of the axle generator AG for a given number of revolutions per minute with a direct current applied to the field stator winding 22 of the axle generator AG, since there is a linear relationship between the generator rotor speed and the output frequency thereof. The axle generator AG gearing and the coupling of the motor M to the generator G are such that the frequencies $f1$ and $f2$ will be equal when the train speed and the speed command are equal.

As the rotor 24 rotates within, and in the same direction as, the electrical field of the stator winding 22 of the axle generator AG, the output from the rotor winding 26 of the axle generator AG is at a frequency $f3$, which is proportional to the difference between the stator supply frequency $f1$ and the frequency of rotation $f2$ of the rotor 24. If the stator winding supply frequency $f1$ is greater than the frequency of rotation $f2$, which occurs when the train speed is less than the command speed, the phase sequence will be in one direction. If $f2$ is greater than frequency $f1$, which occurs when the actual speed of the train exceeds the command speed, the phase sequence will be in the opposite direction. The effect of the change in the phase sequence of the operation of the system will be discussed in detail later.

The output from the rotor winding 26 of the axle generator AG at the frequency $f3$ energizes the three-phase field winding 28 of master relay MR which is a motor type induction relay of the well-known type, which could have a squirrel-cage rotor 30, as shown in the drawings. The torque on the rotor 30 of such a relay is a function of the frequency $f3$ of the energy supplied to the winding thereof, the torque increasing with the alternating current supply frequency due to the direct relationship of voltage and frequency at the output of generator G. As in an induction type motor the direction of torque is dependent upon the phase sequence. However, springs are used to provide a bias in one direction and to return the rotor 30 to the neutral position, and stops prevent reverse movement and limit forward movement to define the angular limits of rotation of the rotor 30.

Actuated by the angular movement of the rotor 30 of the master relay MR are contacts C1 and C2, so positioned that the contact C1 closes when the difference between a stator supply frequency $f1$ and the frequency of rotation $f2$ is a small predetermined amount, and contact C2 closes when the difference between stator supply frequency $f1$ and frequency of rotation $f2$ is a larger predetermined amount. The closure of contact C1 releases the brakes of the locomotive L which occurs when the rotor 30 has moved from its at-rest position indicated by the solid line for contact C1, through the angle designated $y$. Contact C2 closes to apply the power to the locomotive L after the rotor 30 of the master relay MR has passed through the angle designated $z$ between the solid line and dotted line for contact C2. Thus, it can be seen that after the rotor 30 of the master relay MR has passed through the angle $y$ but has not yet reached the angle $z$, the brakes of the locomotive L of the train are released and the power has not been applied to accordingly permit the train to coast. Since the angular position of the rotor 30 of the master relay MR is proportional to the frequency difference between the frequency $f1$ of the energy applied to the stator winding 22 of the axle generator AG and the frequency of rotation $f2$ of the rotor winding 26 of the axle generator AG, when the frequency difference is less than the amount necessary to rotate the contact C1 through the angle $y$, the brakes will be applied since both contacts C1 and C2 will be open. This will also occur when the actual speed of the locomotive L is equal to or greater than the train speed command due to the reversal of the phase sequence, and consequently the reversal of the direction of torque to bring the rotor 30 to its at-rest position. Similarly, any open or short in the circuit would cause the master relay MR to be deenergized, thus restoring the rotor 30 to its at-rest position and thereby applying the brakes.

While there is shown only one contact C1 for brake releasing operation and one contact C2 for power application, it is to be understood that several sequentially actuated contacts can be utilized to provide graded brake and power operation through appropriate control circuits if so desired, the additional braking contacts being added within the angle $y$, and similarly additional contacts for power operation being inserted within the angle $z$, or an overlap may be provided.

In operation, assuming the locomotive L at a stop, it can readily be seen that the commencement of a code rate from code transmitter relay CT would initiate the operation of the system. The rotor 26 of the axle generator AG would be at a standstill and consequently the axle generator AG would react as a transformer. Accordingly, the frequency $f1$ of the power supply to the stator winding 22 would be applied to the field winding 28 of the master relay MR to thereby create a torque on the master relay rotor 30, which torque would be the maximum for that particular code rate. The rotor 30 would revolve through an angle sufficient to sequentially close contacts C1 and C2, thereby releasing the brakes of the locomotive L by closure of contact C1, and applying the power to locomotive L by the closure of contact C2. As the locomotive L accelerates, the supply frequency $f3$, to the field winding 28 of the master relay MR decreases to cause a concurrent decrease in the torque applied to the master relay rotor 30, with the result being a decrease in the angle of rotation thereof. As the master relay rotor 30 revolves a predetermined amount, contact C2 opens to interrupt the supply of power to locomotive L, while at this point contact C1 remains closed to retain the brakes in the released condition, thereby permitting the locomotive L to coast. As the locomotive L reaches the speed dictated by the command speed signal, the stator winding 22 supply frequency $f1$ approaches the frequency of rotation $f2$, and consequently the torque on the rotor 30 of master relay MR approaches zero, to thereby open contact C1 and permit the brakes to be applied. As the brakes are applied the speed of the locomotive L decreases to such an extent that a torque is thereafter applied to the rotor 30 of master relay MR, the torque being of sufficient magnitude to effect the closure of contact C1, thereby releasing the brakes. Consequently, as the locomotive L reaches the speed dictated by the command speed signal, the contact C1 will be opened and closed repeatedly to thereby maintain the speed of the train. Since the speed control equipment of the locomotive L responds more slowly than the speed indicating equipment, the opening and closing of contact C1 would not occur too often.

The changing of the code rate of the code transmitter relay CT will initiate a different command speed signal and consequently a different maximum speed limit for the locomotive L. Similarly, the absence of code will result in the application of the brakes.

On multiple-unit car trains or trains equipped for reverse movement operation, a pair of receivers R can be mounted on both ends of the train, with provisions for connecting the filter amplifier FA to the receivers R at the end of the train corresponding to the direction of travel. Correspondingly the input to the field winding 22 of the axle generator AG would have to be reversed for reverse movement since the rotor 24 of the axle generator AG would travel in the reverse direction. This would permit the electrical field of the field winding 22 to travel in the same direction as the rotor. As an alternative, suitable reverse movement gearing could be provided for the rotor 24 of axle generator AG to eliminate the necessity for transposing the input leads.

FIG. 2 shows a modification of the arrangement of FIG. 1 which eliminates the slip rings required on the axle generator AG of FIG. 1, thus eliminating the maintenance involved. In FIG. 2 the axle generator AG consists of two multiphase generators designated AG1 and AG2, the output of generator G at frequency $f1$ energizing the stator winding 40 of axle generator AG1. The rotor 32 of axle generator AG1 and the rotor 34 of axle generator AG2 are mounted on the same shaft or directly coupled shafts and are geared to the axle to be driven at a speed proportional to the train speed. The rotors 32 and 34 would have a frequency of rotation $f2$ associated therewith as previously described. The connections between the rotor winding 36 of the axle generator AG1 and the rotor winding 38 of the axle generator AG2 are reversed. The numerals 1, 2 and 3 on each rotor winding 36 and 38 and on each stator winding 40 and 42 indicate phase sequence. Assuming that the frequency of rotation $f2$ of the rotors 32 and 34 is less than the frequency $f1$ of the power supplied to the stator winding 40 of the axle generator AG1, the output of the rotor winding 36 will be at a resultant frequency $fr$ which is:

$$fr = f1 - f2$$

If this resultant frequency $fr$ is supplied to the rotor winding 38 of axle generator AG2 so that its phase sequence is in the same direction as the frequency $f2$ of rotation, the induced alternating voltage in the stator winding 42 of axle generator AG2 would be at a frequency $f3$, which would be:

$$f3 = fr + f2$$

but since $$fr = f1 - f2$$

then $$f3 = f1$$

Thus it can be seen that the same phase sequence on both rotor windings 36 and 38 would be undesirable. In order to avoid this the phase sequence on the rotor winding 38 of axle generator AG2 is reversed so that the electrical field therein is rotating opposite to the direction of rotation of the rotor 34. Consequently the voltage induced in the stator winding 42 of axle generator AG2 would be at a frequency $f3$ which would be:

$$f3 = fr - f2$$

Thus the output frequency $f3$ of the stator winding 42 of the axle generator AG2, which is applied to the master relay MR, is $$f3 = f1 - 2f2$$

Although the frequency $f3$ of the output of the stator winding 42 of axle generator AG2 would vary according to twice the frequency $f2$ of rotation instead of one times the frequency $f2$ as in FIG. 1, this would not be serious. The frequency $f3$ would still be proportional to the difference between the frequency $f1$ and the frequency $f2$, and the characteristics of the master relay MR would be selected to compensate for this variance.

In either FIG. 1 or FIG. 2, the torque on the rotor 30 of master relay MR (assuming a fixed position, i.e., blocked rotor condition), assuming that the voltage output of generator G is proportional to its frequency $f1$ and neglecting losses, is proportional to frequency $f3$. With the rotor 30 spring biased, the rotor 30 of master relay MR will rotate until the torque produced by frequency $f3$ overcomes the spring torque, thus permitting contacts C1 and C2 to be closed at different positions depending upon frequency $f3$.

Because of this spring bias, it is necessary to increase the speed command frequency $f$ by a corresponding amount $fs$, as shown in FIG. 3 to correct for the increased amount of torque needed due to the spring bias. The dotted line 44 in FIG. 3 illustrates graphically the ideal relationship between the speed command frequency $f$ and the actual command speed $Vcs$ of the train, while the solid line 46 illustrates the graphical relationship with the addition of the supplemental frequency $fs$ to overcome the torque of the spring bias. The addition of the supplemental frequency $fs$ would be accomplished by increasing the code rate of the code transmitter relay CT in FIG. 1 by the proper amount to compensate for the spring bias. While the graphical relationship in FIG. 3 is shown to be linear, it is to be understood that the relationship need not be linear, the only requirement being that the relationship be proportional and predictable. The addition of the supplemental frequency $fs$ provides an advantage in that a smaller range of modulation or code rates of the carrier frequency is required, permitting a narrower band filter.

Thus, if the code or modulation rate $f$ is proportional to the command speed $Vcs$ plus a constant, $$f \sim Vcs + Vk$$

and if the motor-generator set M-G is so proportioned that $$f1 = 2C(Vcs + Vk)$$

and the axle generator AG arranged so that $$f2 = CV$$

where V is the velocity of the train and C represents a constant, then $$f3 = f1 - 2f2 = 2C(Vcs - V + Vk)$$

Therefore, if the spring bias on the rotor 30 of master relay MR is such that contact C2 closes when $f3 = 2CVk$, contact C1 will close when $V = Vcs$. Thus, if the train velocity V exceeds the command speed $Vcs$, contact C1 opens, applying the brakes.

As a modification of the above-described system, a constant current alternating current supply source can be used to transmit to the track rails 10 command speed signals of various frequencies, a particular frequency being indicative of a given speed. By utilizing a constant current source, the voltage across the track rails 10 would vary directly as the frequency. The signal in the track rails 10 would be picked up by receivers R of the locomotive L and fed into suitable amplifying means (not shown). The amplifying means would be so constructed to produce a three-phase output with the voltage increasing directly as the frequency increases. This output would supply the energy for the field stator winding 22 of axle generator AG. The axle generator AG and master relay MR would react as previously described to control the speed according to the variable frequency command speed signal.

Thus it can be seen that the speed control system of my invention is simple, reliable, and relatively maintenance free and can be utilized to control the speed of a body having a rotating member, the rotation of which is proportional to the actual speed of the body whose speed is desired to be measured.

Having described preferred embodiments of my invention it is desired that the invention be not limited to the specific constructions inasmuch as it is apparent that many additional modifications may be made without departing from the broad spirit and scope of my invention.

Having thus described my invention, what I claim is:
1. A speed control system for a body having a rotating member the speed of which is to be controlled according to a coded or modulated alternating current command speed signal indicative of the desired speed, said system comprising:
   (a) means for detecting the alternating current command speed signal;
   (b) means receiving the energy from said detecting means for amplifying and translating said energy to produce a multiphase alternating current output at a frequency proportional to said command speed signal, the voltage of said multiphase output having a direct relationship to the frequency thereof;
   (c) speed comparison means energized by said multiphase output and having an input proportional to the actual speed of said rotating member to produce a multiphase output at a frequency proportional to the difference between the speed indicated by said command speed signal and the actual speed;
   (d) a relay having a multiphase field winding and a rotor, said field winding being energized by the output of said speed comparison means to produce a torque on said relay rotor, said rotor being movable within a predetermined angle, the magnitude of said torque being proportional to the frequency of the output of said speed comparison means due to the direct relationship between the voltage and the frequency of the output of said amplifying and translating means, and a plurality of contacts actuated by the movement of said relay rotor to selectively actuate each of said contacts according to the angle of rotation of said relay rotor to thereby operate circuits controlling the speed of said rotating member.

2. A speed control system for a body having a rotating member the speed of which is to be controlled according to a coded or modulated alternating current command speed signal indicative of the desired speed, said system comprising:
   (a) means for detecting the alternating current command speed signal;
   (b) demodulating means receiving the energy from said detecting means and demodulating said energy to produce an alternating current output at a frequency proportional to said command speed signal;
   (c) means responsive to the output of said demodulating means for producing a multiphase output at a frequency proportional to the frequency of the output of said demodulating means;
   (d) speed comparison means energized by said multiphase output and having an input proportional to the actual speed of said rotating member to produce a multiphase output at a frequency proportional to the difference between the speed indicated by said command speed signal and the actual speed;
   (e) a relay having a multiphase field winding and a rotor, said field winding being energized by the output of said speed comparison means to produce a torque on said relay rotor, said rotor being movable within a predetermined angle, the magnitude of said torque being proportional to the frequency of the output of said speed comparison means, and a plurality of contacts actuated by the movement of said relay rotor to selectively actuate each of said contacts according to the angle of rotation of said relay rotor to thereby operate circuits controlling the speed of said rotating member.

3. A speed control system for a body having a rotating member the speed of which is to be controlled according to a coded or modulated alternating current command speed signal indicative of the desired speed, said system comprising:
   (a) means responsive to the command speed signal to produce a multiphase output at a frequency proportional to said command speed signal;
   (b) a multiphase generator having a stator and rotor, the stator winding of said generator being energized by the multiphase output of said means, the rotor of said generator being coupled to said rotating member and driven at a speed proportional to the speed of said rotating member, the rotor winding of said rotor having an induced alternating current output at a frequency proportional to the difference between the output frequency of said means and the frequency of rotation of said rotor;
   (c) a relay having a multiphase field winding and a rotor, said field winding being energized by the output of the rotor of said generator to produce a torque on said relay rotor, said rotor being movable within a predetermined angle, the direction and magnitude of said torque being determined by the difference between the frequency of said means and the driven frequency of the rotor, and a plurality of contacts actuated by the movement of said relay rotor to selectively actuate each of said contacts according to the angle of rotation of said relay rotor to operate circuits controlling the speed of said rotating member.

4. A speed control system for a train which is to be controlled according to a coded or a modulated alternating current command speed signal indicative of the desired speed, said system comprising:
   (a) first means for detecting the alternating current command speed signal and producing energy representative of said alternating current command speed signal;
   (b) second means receiving said energy from said first means and being responsive to said energy to produce an alternating current output at a frequency proportional to said command speed signal;
   (c) an alternating current motor energized by said output and driven at a speed proportional to the frequency of the output of said second means;
   (d) a generator coupled to and driven by said motor for producing a multiphase output at a frequency proportional to the frequency of the output of said second means, the voltage of the output of said generator having a direct relationship to the frequency thereof;
   (e) speed comparison means having as a first input the output of said generator and a second input proportional to the actual speed of said train to produce a multiphase output at a frequency proportional to the difference between the speed indicated by said command speed signal and the actual speed of the train;

(f) a relay having a multiphase field winding and a rotor, said field winding being energized by the output of said speed comparison means to produce a torque on said relay rotor, said rotor being movable within a predetermined angle, the magnitude of said torque being proportional to the frequency of the output of said speed comparison means due to the direct relationship between the voltage and the frequency of the output of said generator, and a plurality of contacts actuated by the movement of said relay rotor to selectively actuate each of said contacts according to the angle of rotation of said relay rotor to thereby operate circuits controlling the speed of said train.

5. A speed control system for a train which is to be controlled according to a coded or a modulated alternating current command speed signal indicative of the desired speed, said system comprising:
 (a) first means for detecting the alternating current command speed signal and producing energy representative of said alternating current command speed signal;
 (b) second means receiving said energy from said first means and being responsive to said energy to produce an alternating current output at a frequency proportional to said command speed signal;
 (c) third means responsive to the output of said second means for producing a multiphase output at a frequency proportional to the frequency of the output of said second means, the voltage of said multiphase output having a direct relationship to the frequency thereof;
 (d) a multiphase generator having a stator and a rotor, the stator winding of said generator being energized by the multiphase output of said third means, the rotor of said generator being coupled to an axle of said train and driven at a speed proportional to the speed of said train, the rotor winding of said rotor having an induced alternating current output at a frequency proportional to the difference between the output frequency of said third means and the frequency of rotation of said rotor, the parts of said third means and said generator being so proportioned that the frequency of rotation of said rotor and the frequency of the output of said third means are equal when the train speed equals the speed indicated by said command speed signal;
 (e) a relay having a multiphase field winding and a rotor, said field winding being energized by the output of said generator to produce a torque on said relay rotor, said relay rotor being movable within a predetermined angle, the magnitude of said torque being proportional to the frequency of the output of said generator due to the direct relationship between the voltage and the frequency of the output of said third means, and a plurality of contacts actuated by the movement of said relay rotor to selectively actuate each of said contacts according to the angle of rotation of said relay rotor to thereby operate circuits controlling the speed of said train.

6. A speed control system for a train which is to be controlled according to a coded or modulated alternating current command speed signal indicative of the desired speed, such system comprising:
 (a) a first means for detecting the alternating current command speed signal;
 (b) second means receiving the energy from said first means and being responsive to said energy to produce an alternating current output at a frequency proportional to said command speed signal;
 (c) third means responsive to the output of said second means for producing a multiphase output at a frequency proportional to the frequency of the output of said second means, the voltage of said multiphase output having a direct relationship to the frequency thereof;
 (d) a multiphase generator having a first and second stator windings and a first and second rotor windings, the first stator winding of said generator being energized by the multiphase output of said third means, the rotor of said generator being coupled to the axle of said train and driven at a speed proportional to the speed of said train and in the direction of the electrical field of said first stator winding, said first rotor winding having an induced alternating current output at a frequency proportional to the difference between the output frequency of said third means and the frequency of rotation of said rotor, the output of said first rotor winding being supplied to said second rotor winding in reverse phase sequence to the direction of rotation of said rotor, said second stator winding having an induced alternating current output at a frequency proportional to the difference between the output frequency of said third means and twice the frequency of rotation of said rotor, the parts of said third means and said generator being so proportioned that the frequency of rotation of said rotor and the frequency of the output of said third means are equal when the train speed equals the speed indicated by said command speed signal; and
 (e) a relay having a multiphase field winding and a rotor, said field winding being energized by the output of said generator to produce a torque on said relay rotor, said relay rotor being movable within a predetermined angle, the magnitude of said torque being proportional to the frequency of the output of said generator due to the direct relationship between the voltage and the frequency of the output of said third means, and a plurality of contacts actuated by the movement of said relay rotor to selectively actuate each of said contacts according to the angle of rotation of said relay rotor to thereby operate circuits controlling the speed of a train.

7. In a speed control system for a body having a rotating member, the system having speed comparison means supplied by a multiphase alternating current source of energy of a frequency proportional to the desired speed, the voltage of said source of energy bearing a direct relationship to the frequency thereof, said speed comparison means comprising:
 (a) an axle generator having stator means and rotor means, a stator winding of said stator means being supplied with multiphase alternating current energy from said source of energy at a frequency proportional to the desired speed to produce a rotating magnetic field, a rotor of said rotor means being driven in the same direction as said rotating field at a speed proportional to the speed of said rotating member, the rotor winding of said rotor having an induced alternating current output at a frequency proportional to the difference between the supply frequency to the stator winding and the frequency of rotation of said rotor;
 (b) a relay having a multiphase field winding and a rotor operatively connected to a plurality of contacts;
 (c) means for transferring the output of the axle generator rotor winding to the multiphase field winding of said relay to produce a torque on said relay rotor, said relay rotor being movable within a predetermined angle, the magnitude of said torque being proportional to the frequency of the output of said axle generator rotor winding due to the direct relationship between the voltage and frequency of said source of energy, said plurality of contacts being operated by the movement of said relay rotor to selectively actuate each of said contacts according to the angle of rotation of said relay rotor to thereby operate circuits controlling the speed of said body.

References Cited by the Examiner

UNITED STATES PATENTS

| | | | |
|---|---|---|---|
| 1,284,885 | 11/1918 | Franklin | 318—318 X |
| 1,992,625 | 2/1935 | Mathes | 323—52 X |
| 2,222,801 | 11/1940 | Logan | 246—182 |
| 2,381,250 | 7/1945 | Baumann | 318—318 X |
| 2,501,543 | 3/1950 | Short | 318—318 X |
| 2,512,322 | 6/1950 | Frisch et al. | 321—64 X |
| 2,670,433 | 2/1954 | Shields | 246—182 X |
| 2,710,372 | 6/1955 | McCleery | 321—64 X |
| 2,841,745 | 7/1958 | Shields | 246—182 X |
| 3,024,395 | 3/1962 | Pedersen et al. | 318—85 X |
| 3,253,143 | 5/1966 | Hughson | 246—182 X |

References Cited by the Applicant

UNITED STATES PATENTS

| | | |
|---|---|---|
| 2,256,487 | 9/1941 | Moseley et al. |
| 2,713,143 | 7/1955 | Bock. |

ARTHUR L. LA POINT, *Primary Examiner.*

S. B. GREEN, *Assistant Examiner.*